E. CHALUPA, D. BROOKS & D. BROOKS, Jr.
INSECT GUARD.
APPLICATION FILED MAY 13, 1915.
1,218,595. Patented Mar. 6, 1917.
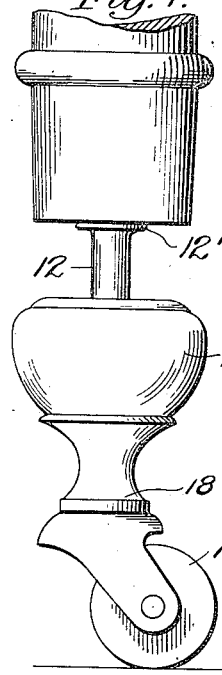
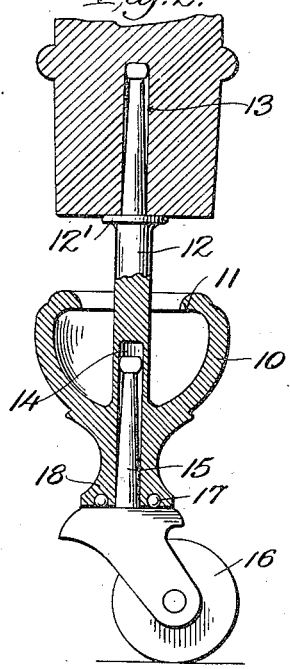
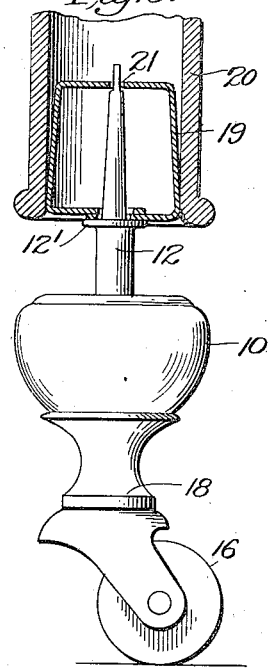
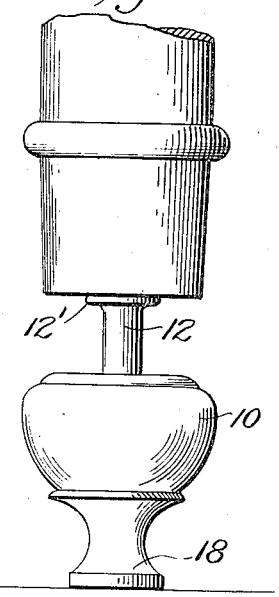
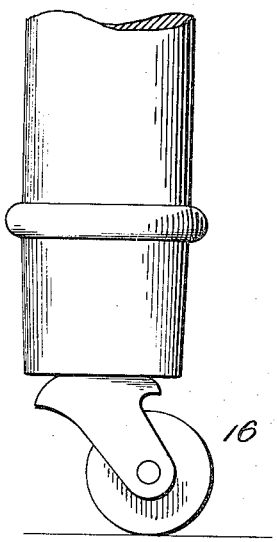
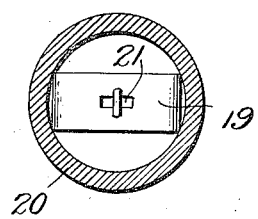
Emil Chalupa,
David Brooks,
David Brooks, jr.,
INVENTORS,
By James F. Duhamel,
ATTORNEY.

UNITED STATES PATENT OFFICE.

EMIL CHALUPA, OF NEW YORK, AND DAVID BROOKS AND DAVID BROOKS, JR., OF BROOKLYN, NEW YORK.

INSECT-GUARD.

1,218,595. Specification of Letters Patent. Patented Mar. 6, 1917.

Application filed May 13, 1915. Serial No. 27,758.

*To all whom it may concern:*

Be it known that we, EMIL CHALUPA, a citizen of the United States, and resident of the city, county, and State of New York, and DAVID BROOKS and DAVID BROOKS, Jr., citizens of the United States, and residents of the city of Brooklyn, county of Kings, and State of New York, have invented certain new and useful Improvements in Insect-Guards, of which the following is a specification.

This invention relates to insect guards, and its object is to provide a cup to be fitted beneath the leg of a bed, table or other article of household furniture, and to contain a liquid injurious or obnoxious to insects, so they will be prevented from passing above the same. The cup is provided with a stem to enter the socket in the leg of the article, which has been made therein for the stem of the caster, and within the lower end of the cup and its stem is also a socket to receive the stem of the caster; the device being adapted to be interposed between the leg and the caster without any preparation for its reception, as will be more fully described in the following specification, set forth in the claims, and illustrated in the drawings, wherein:

Figure 1 is a side elevation of the device.

Fig. 2 is a vertical sectional view of the same.

Fig. 3 shows the application of the guard to a hollow iron leg.

Fig. 4 is a view of the invention showing the caster dispensed with.

Fig. 5 shows the caster only in use.

Fig. 6 is a plan view of Fig. 3.

While insect guards have been previously invented and introduced, their nature has been such as to require specially constructed furniture to fit them to, or they have lacked the solidity necessary for the furniture for which they were intended, and the present invention is designed as a simple device adapted to be applied to the leg of the furniture without any previous preparation, and its stem to occupy the place of the usual caster stem, while means are also provided for the use of the caster.

The cup 10 may be of metal and has its upper edge 11 turned inward to prevent the liquid contained in the cup from being thrown out by any sudden movement, and from the bottom of the cup rises a stem 12 whose upper portion enters a socket 13 common in the legs of furniture and generally used for the stems of casters. The upper end of the stem may terminate in a ball to support the leg or the flange 12' may be used for that purpose.

The lower part of the stem 12 is also provided with a socket 14 for the stem 15 of the caster 16, and ball bearings 17 may be provided at the lower end of the base 18 of the bowl to permit of an easy rotation of the caster as the furniture is moved.

In furniture of metal it is customary to connect the caster thereto by means of a flat metal frame 19 sprung into the hollow leg 20 and the upper point of the stem 12 is flattened to pass through a slot 21 and be turned at an angle so that it cannot fall out or be removed until the head and slot coincide. Perforations or notches may be provided in the lower end of the frame 19 for the passage of the upper end of the stem 12. The point of the stem of the caster may also be so constructed as to be connected with the frame 19 when it is desired to remove the cup and substitute the caster as the sole support.

It is obvious that other modifications and arrangements of the parts may be made without departing from the essential features above described, or from the scope of the appended claims.

What we claim is:

1. In an insect guard, the combination with the leg of a piece of furniture having a socket at its end, of a stem adapted to fit the socket, a bulb with inturned upper edges and a bottom socket, and a caster with a stem adapted to fit the socket of the leg or the bulb.

2. In an insect guard, the combination with the leg of a piece of furniture having a socket, of a cup with a similar socket, and identical stems adapted to fit the sockets; one carrying the cup while the other is provided with a caster.

3. In an insect guard, the combination with a cup having inturned edges and a socket, of an upwardly extending integral stem adapted to be inserted in the socket of a piece of furniture, and an identical stem
5 carrying a caster and adapted to fit either socket.

Signed at New York in the county of New York and State of New York this 29th day of April, 1915.

EMIL CHALUPA.
  DAVID BROOKS.
  DAVID BROOKS, Jr.

Witness:
 DAVID COHEN.